US 6,725,984 B2

(12) United States Patent
Orita

(10) Patent No.: US 6,725,984 B2
(45) Date of Patent: Apr. 27, 2004

(54) ROTARY DAMPER

(75) Inventor: Nobutoshi Orita, Itabashi-ku (JP)

(73) Assignee: Tok Bearing Co., Ltd., Tokyo (JP)

(*) Notice: Subject to any disclaimer, the term of this patent is extended or adjusted under 35 U.S.C. 154(b) by 0 days.

(21) Appl. No.: 10/150,406

(22) Filed: May 17, 2002

(65) Prior Publication Data

US 2002/0179387 A1 Dec. 5, 2002

(30) Foreign Application Priority Data

Jun. 4, 2001 (JP) .......................... 2001-168690

(51) Int. Cl.⁷ ................................. F16K 9/14
(52) U.S. Cl. ................. 188/290; 188/296; 4/246.2
(58) Field of Search ...................... 188/290, 293, 188/296; 4/236, 240, 246.2; 16/54, 82, 85

(56) References Cited

U.S. PATENT DOCUMENTS

| 1,778,905 | A | * | 10/1930 | Mitchell | 267/223 |
| 1,876,004 | A | * | 9/1932 | Hofmann | 188/290 |
| 2,750,008 | A | * | 6/1956 | Gassot | 188/274 |
| 2,790,520 | A | * | 4/1957 | Kuhn | 188/307 |
| 3,300,005 | A | * | 1/1967 | Good | 192/61 |
| 4,768,630 | A | * | 9/1988 | Aubry et al. | 188/290 |
| 5,152,189 | A | | 10/1992 | Miura et al. | |
| 5,392,884 | A | * | 2/1995 | Ojima | 188/293 |
| 5,664,286 | A | * | 9/1997 | Sorimachi | 16/54 |
| 5,697,122 | A | | 12/1997 | Okabe et al. | |
| 5,768,718 | A | * | 6/1998 | Sorimachi | 4/236 |
| 6,067,667 | A | * | 5/2000 | Suzuki | 4/246.1 |

FOREIGN PATENT DOCUMENTS

| JP | 2581655 | 11/1996 |
| JP | 2894596 | 3/1999 |
| JP | 2000-120747 | 4/2000 |

* cited by examiner

Primary Examiner—Robert A. Siconolfi
(74) Attorney, Agent, or Firm—Merchant & Gould P.C.

(57) ABSTRACT

A rotary damper has a casing having a fluid chamber filled with a fluid, a rotatable member disposed in the fluid chamber for rotation relative to the casing, a vane disposed on an outer circumferential surface of the rotatable member and extending in an axial direction thereof, the vane projecting toward an inner circumferential surface of the fluid chamber and having a first side and a second side opposite to the first side, a fluid passage for allowing the fluid to flow between the first side and the second side at or near a tip end of the vane, and a valve body mounted on the vane for selectively opening and closing the fluid passage. The valve body comprises a valve disposed in a position for closing the fluid passage and a spring for normally urging the valve in a direction to close the fluid passage. The valve and the spring are integrally formed. When the rotatable member rotates in a first direction, the valve opens the fluid passage against the urge of the spring under the pressure of the fluid on the first side of the vane. When the rotatable member stops against rotation, the valve instantaneously closes the fluid passage under the urge of the spring. When the rotatable member rotates in a second direction, the valve keeps closing the fluid passage under the urge of the spring and the pressure of the fluid on the second side of the vane.

11 Claims, 12 Drawing Sheets

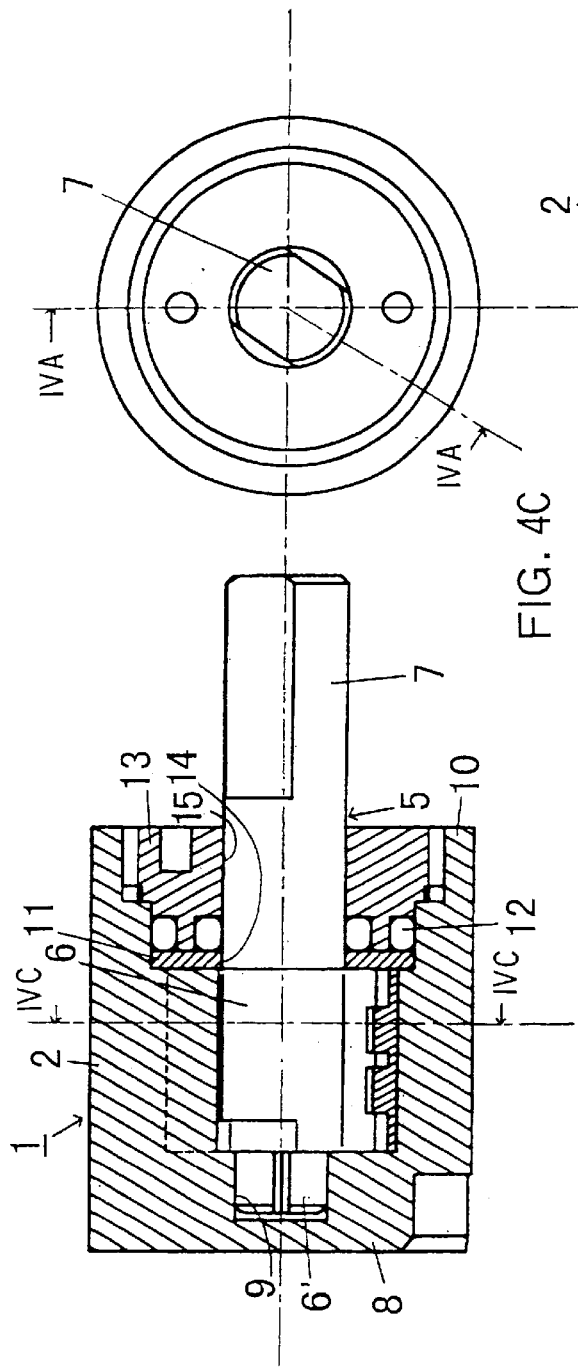
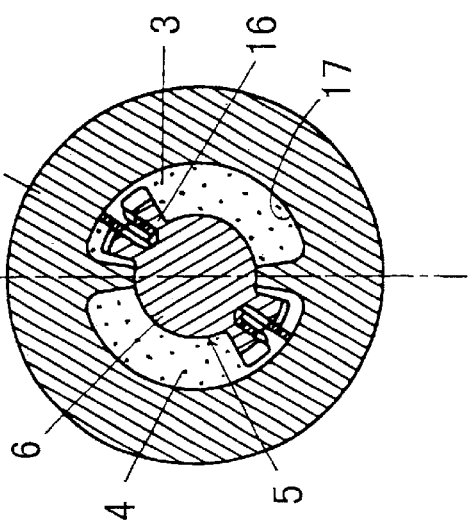
FIG. 4A
FIG. 4B
FIG. 4C

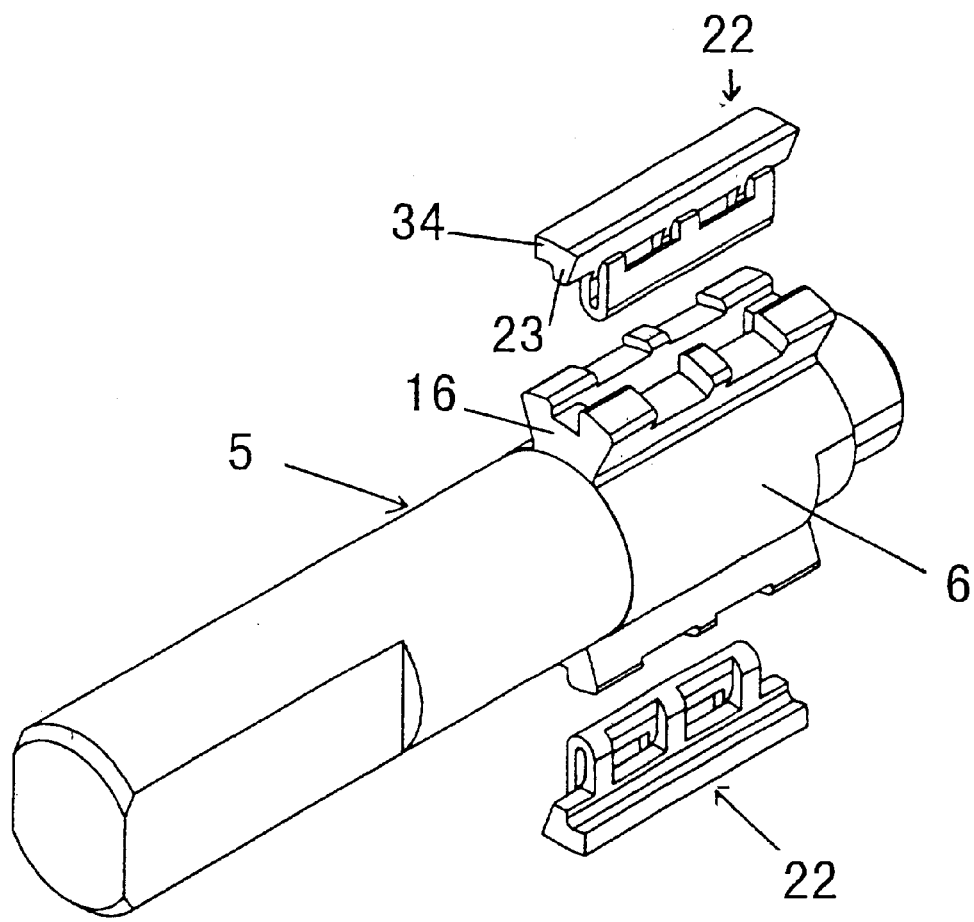

FIG. 15A
FIG. 15B
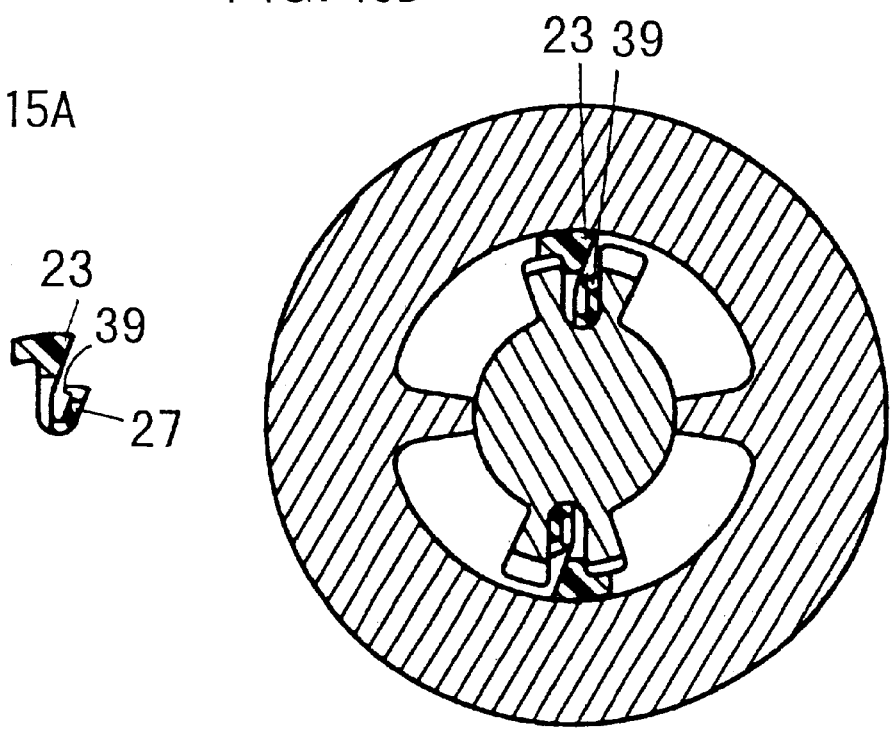
FIG. 16A
FIG. 16B
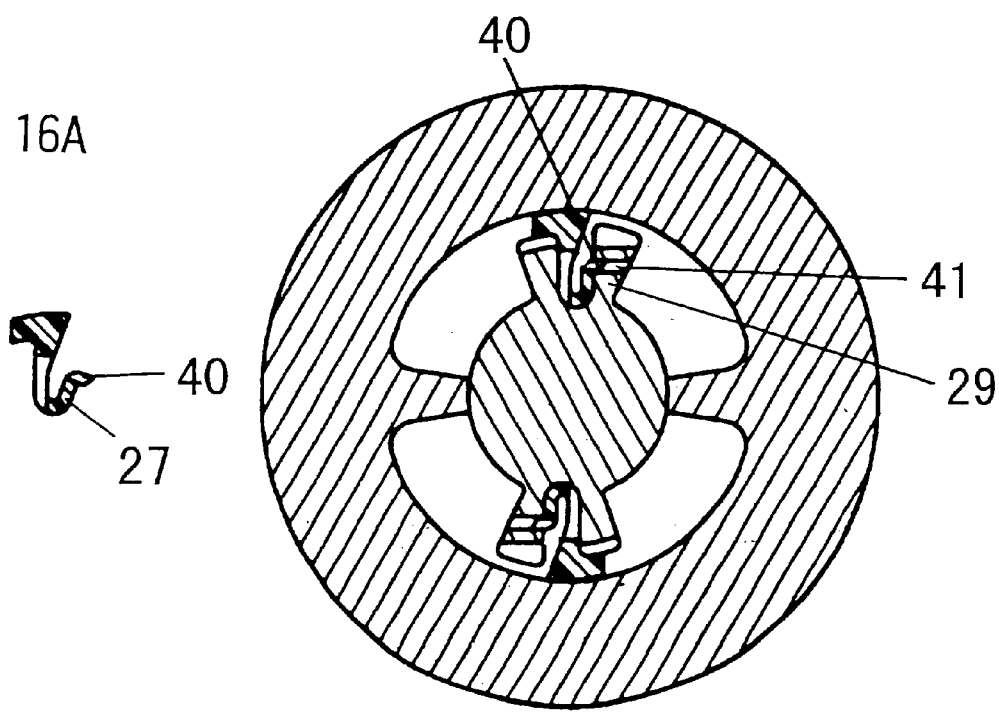

ROTARY DAMPER

BACKGROUND OF THE INVENTION

1. Field of the Invention

The present invention relates to a rotary damper for applying damping forces to a lid, a door, or the like when it is opened and closed.

2. Description of the Prior Art

One conventional rotary damper for applying damping forces to a lid, a door, or the like when it is opened and closed is disclosed in Japanese patent No. 2581655, for example. As shown in FIG. 20 of the accompanying drawings, the disclosed rotary damper has a rotatable member 5 rotatable about its own axis. When the rotatable member 5 rotates counterclockwise to open a lid connected thereto, for example, a valve body 22 interposed between a vane 16 disposed on the outer circumferential surface of the rotatable member 5 and the inner circumferential surface of a cylindrical casing 2 moves clockwise with respect to the vane 16, producing a fluid passage for a fluid to pass between the valve body 22 and the vane 16 through recesses 101, 102 defined in at least one of the valve body 22 and the vane 16. Therefore, when the lid is opened, since almost no resistance is developed to the fluid flowing through the fluid passage, the torque generated by the rotary damper is low, and the lid can be opened by a force corresponding to its weight.

When the rotatable member 5 rotates clockwise in the direction indicated by the arrow to close the lid from its open position, no gap is formed between the valve body 22 and the vane 16, and the fluid passage which has been produced is closed. Therefore, the flow of the fluid is greatly limited, and the rotary damper generates a high torque.

The conventional rotary damper has a clearance or play 103 that exists until the valve body 22 is brought into contact with the vane 16, closing the fluid passage. When the rotatable member 5 is rotated in the direction to close the lid, therefore, it takes the rotary damper a certain period of time before making a damping action based on the counterclockwise movement of the valve body 22 across the clearance 103. While the valve body 22 is moving counterclockwise across the clearance 103, the rotary damper does not produce a high torque and does not make a damping action. The range or period in which no damping action takes place is referred to as "backlash".

When the keyboard lid of a piano which incorporates the conventional rotary damper is slightly opened and then released, for example, since the rotary damper does not immediately produce a damping action due to the backlash, it is dangerous disadvantage that the keyboard lid may possibly be closed quickly.

To solve the above problem of the conventional rotary damper, the applicant of the present application has proposed a rotary damper free of backlash as disclosed in Japanese patent No. 2894596. As shown in FIG. 21 of the accompanying drawings, the proposed rotary damper includes a rotatable member 5 having a vane 16 which has a tip end of circular cross section, and a valve body 22 of C-shaped cross section fitted over and movably mounted on the tip end of the vane 16.

When the rotatable member 5 of the rotary damper shown in FIG. 21 rotates clockwise in the direction indicated by the arrow D, e.g., to open a lid connected to the rotary damper, the valve body 22 turns counterclockwise on the vane 16 due to a fluid resistance, a fluid passage 104 is produced between the valve body 22 and the inner circumferential surface of a cylindrical casing 2. When the rotary member 5 rotates counterclockwise, e.g., to close the lid, the valve 22 turns clockwise on the vane 16, closing the fluid passage 10. Therefore, the rotary damper can make a damping action relatively quickly.

With the above rotary damper, however, there is a certain limitation on efforts to reduce the magnitude of the backlash because the valve body is angularly moved by only the resistance that is caused to the fluid upon rotation of the rotating body.

As an improvement designed to eliminate the backlash of the above rotary damper, there has been proposed a rotary damper disclosed in Japanese laid-open patent publication No. 2000-120747. The proposed rotary damper has a spring mounted on a valve body for immediately closing a fluid passage to make a quick damping action.

Specifically, as shown in FIG. 22 of the accompanying drawings, the proposed rotary damper comprises a rotating body 5, a pair of vanes 16 projecting radially outwardly from the outer circumferential surface of the rotating body 5 and having respective recesses 102 defined in their tip ends, a pair valve bodies 22 each of a substantially L-shaped cross section having an arcuate portion 105 and a radial portion 106 and covering at least of respective tip end surfaces of the vanes 16, and a pair of springs 107 which are separate from the valve bodies 22 and interposed between the vanes and the valve bodies 22. Since the two vanes 16 and various components combined therewith are identical to each other, only one of the vanes 16 and components combined therewith will be described below. When the rotary damper is in a normal position shown in FIG. 22, the spring 107 urges the radial portion 106 into close contact with a side 108 of the vane 16 which faces in the direction to exert damping forces. When the rotatable member 5 rotates counterclockwise in the direction indicated by the arrow A, i.e., rotates idly, a tongue 110 of the spring 107 is deformed in a clockwise direction opposite to the direction indicated by the arrow A under the pressure of a viscous fluid, displacing the radial portion 106 away from the side 108.

The spring 107 includes a cross-sectionally channel-shaped fitting member 109 fitted in the recess 102, and the tongue 110 projects outwardly from the fitting member 109 and has an outer end fitted in a slot 111 defined in the arcuate portion 105 of the valve body 22. Therefore, the spring 107 is of a considerably complex structure.

If the rotary damper is small in size, then the space between the vane 16 and the valve body 22 for placing the spring 107 therein is also small in size. Therefore, the rotary damper cannot easily be assembled. The rotary damper is costly to manufacture because it is made up of a relatively large number of parts.

When the rotatable member 5 rotates idly in the direction indicated by the arrow A, the spring 107 is greatly deformed in the direction opposite to the direction indicated by the arrow A due to the resistance from the viscous fluid. After the rotary damper has been used over a long period of time, therefore, the spring 107 which is of a complex structure tends to be broken by fatigue at various locations on the fitting member 109 and the tongue 110. Particularly, the tongue 110 is liable to suffer elastic fatigue. Consequently, the rotary damper is likely to develop backlash after it has been used over a long period of time.

SUMMARY OF THE INVENTION

It is an object of the present invention to provide a rotary damper which will solve the problems of the conventional rotary dampers.

To achieve the above object, there is provided in accordance with the present invention a rotary damper comprising a casing having a fluid chamber filled with a fluid, a rotatable member disposed in the fluid chamber for rotation relative to the casing, a vane disposed on an outer circumferential surface of the rotatable member and extending in an axial direction thereof, the vane projecting toward an inner circumferential surface of the fluid chamber and having a first side and a second side opposite to the first side, a fluid passage for allowing the fluid to flow between the first side and the second side at or near a tip end of the vane, and a valve body mounted on the vane for selectively opening and closing the fluid passage, the valve body comprising a valve disposed in a position for closing the fluid passage and a spring for normally urging the valve in a direction to close the fluid passage, the valve and the spring being integrally formed, the arrangement being such that when the rotatable member rotates in a first direction, the valve opens the fluid passage against the urge of the spring under the pressure of the fluid on the first side of the vane, that when the rotatable member stops against rotation, the valve instantaneously closes the fluid passage under the urge of the spring, and that when the rotatable member rotates in a second direction, the valve keeps closing the fluid passage under the urge of the spring and the pressure of the fluid on the second side of the vane.

The valve body mounted on the vane for selectively opening and closing the fluid passage comprises the valve disposed in the position for closing the fluid passage and the spring for normally urging the valve in the direction to close the fluid passage. The valve and the spring are integrally formed. Therefore, when the rotatable member stops against rotation in the first direction, i.e., an idling direction not to produce a torque, the valve is automatically pressed against a side of the vane under the urge of the spring. Therefore, the fluid passage which has been open is instantaneously closed. When the rotatable member subsequently starts rotating in the second direction, i.e., a damping direction to produce a torque, the rotary damper immediately generates a high torque in the fluid chamber, quickly making a damping action.

The valve body which is made up of the valve and the spring that are integrally formed with each other is simple in structure. Even if the rotary damper is small in size with the clearance being small between the vane and the inner circumferential surface of the fluid chamber, the valve body with the spring function can easily be installed in the clearance. The rotary damper can easily be assembled, and can be manufactured at a greatly reduced cost as the number of parts of the rotary damper is greatly reduced.

The valve body is made of a springy material. Therefore, the valve body itself is of a simple structure, making the rotary damper inexpensive.

The springy material comprises a nonmetal spring material such as rubber, plastics, or the like. The valve body can thus be formed with ease, and has the advantage of highly nonmagnetic and corrosion-resistant properties.

Alternatively, the springy material comprises a metal spring material such as steel, copper alloy, or the like. The valve body thus constructed allows the spring to produce a large urging force. If the valve body is made of spring steel, then since it has a large modulus of elasticity, the valve body has high elasticity, fatigue, and creep limitations. If the valve body is made of stainless steel, then it has the advantage of highly heat-resistant and corrosion-resistant properties. If the valve body is made of copper alloy for springs, then it has the advantage of highly nonmagnetic and corrosion-resistant properties.

The valve body comprises a leaf spring. The valve body in the form of a leaf spring is capable of bearing the resistance from the fluid, i.e., the pressure of the fluid with a large area. Therefore, when the rotatable member rotates in the first direction, i.e., in the idling direction, the fluid passage is easily opened, lowering the generated torque easily within a short period of time.

The vane has an axially extending slot defined in the tip end thereof by a first wall surface, a second wall surface confronting the first wall surface, and a bottom surface joining the first wall surface and the second wall surface to each other, the valve body being removably fitted in the slot, the valve fitted in the slot extending across the fluid passage to block the fluid passage and having at least a portion held against the first wall surface, the spring comprising a first extension extending from the valve, a curved portion extending from the first extension, and a second extension extending from the curved portion, the arrangement being such that the spring applies a urging force to the valve in a direction to close the fluid passage when a load is applied to the curved portion. Though the valve body is made of a single material, it may be constructed to have a spring function for urging the valve in the direction to close the fluid passage, and is not required to have a separate spring. The valve body with the spring function can thus be made highly simple in structure. The location where the valve body is installed can be produced simply by forming the axially extending concave portion, for example slot, in the tip end of the vane. The valve body which is of a highly simple structure can easily be fitted into the slot simply by compressing both of tongue portions, i.e. the valve or the first extension of the spring and the second extension toward each other and inserting them into the slot. Even if the clearance between the rotatable member and the inner circumferential surface of the fluid chamber is small due to a reduction in size of the rotary damper, the rotary damper can easily be assembled.

The fluid passage is defined between the tip end of the vane and the inner circumferential surface of the fluid chamber, the valve extending radially outwardly and having a tip end thereof held against the inner circumferential surface of the fluid chamber. When the rotatable member rotates in the first direction, i.e., in the idling direction, the valve bears the pressure of the fluid on the first side, so that the valve body is displaced away from the first wall surface, opening the fluid passage. When the rotatable member stops against rotation, the displaced valve body is immediately brought into close contact with the first wall surface under the urge of the valve or the first extension, instantaneously closing the fluid passage. When the rotatable member thereafter rotates in the second direction, i.e., the damping direction to produce a torque, the rotary damper produces a high torque in the fluid chamber, quickly making a damping action.

The valve has a ledge filling the space, serving as the fluid passage, between the tip end of the vane and the inner circumferential surface of the fluid chamber. When the rotatable member rotates in the first direction, i.e., in the idling direction, since the valve surely bears the pressure of the fluid on the first side, the valve body is immediately displaced away from the first wall surface, opening the fluid passage.

The tip end of the vane is held in contact with the inner circumferential surface of the fluid chamber, and the fluid passage is defined in the tip end of the vane. As it is sufficient for the valve body to have a length large enough to close the fluid passage at its valve, the dimensional accuracy of the valve body may be low.

The second extension has an end for limiting a range of movement of the valve when the valve is displaced away from the first wall surface and opens the fluid passage. Inasmuch as the range of movement of the valve is largely limited, any elastic deformation of the spring in the direction opposite to its urging direction is also largely limited. Accordingly, the spring is essentially free of elastic fatigue even when the rotary damper is used over a long period of time.

The valve has an apex seal function. When the rotatable member rotates in the second direction, i.e., the damping direction, the valve and the inner circumferential surface of the fluid chamber are held in close contact with each other. Therefore, the fluid is fully limited against flowing from the region where the valve and the inner circumferential surface of the fluid chamber are held in close contact with each other. The rotary damper is thus capable of generating a strong damping force upon rotation in the damping direction. The term "apex seal function" refers to a function for the pressure-bearing surface of the valve to bear the pressure of the fluid for thereby pressing the valve body toward the inner circumferential surface of the fluid chamber to press the tip end of the valve against the inner circumferential surface of the fluid chamber.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 4A is a side elevational view of the rotary damper shown in FIG. 1;

FIG. 4B is a cross-sectional view taken along line IVB—IVB of FIG. 4A;

FIG. 4C is a cross-sectional view taken along line IVC—IVC of FIG. 4B;

FIG. 7A is a front elevational view of the modified valve body shown in FIG. 6;

FIG. 7B is a side elevational view of the modified valve body shown in FIG. 7A;

FIG. 8 is a perspective view of a rotary damper according to a second embodiment of the present invention;

FIG. 15A is a cross-sectional view of a valve body of a rotary damper according to a fourth embodiment of the present invention;

FIG. 15B is a cross-sectional view of the rotary damper in which the valve body shown in FIG. 15A is inserted in a slot in a vane;

FIG. 16A is a cross-sectional view of another valve body for use in the rotary damper according to the fourth embodiment of the present invention;

FIG. 16B is a cross-sectional view of the rotary damper in which the valve body shown in FIG. 16A is inserted in a slot in a vane;

DETAILED DESCRIPTION OF THE PREFERRED EMBODIMENTS

Figure 17:
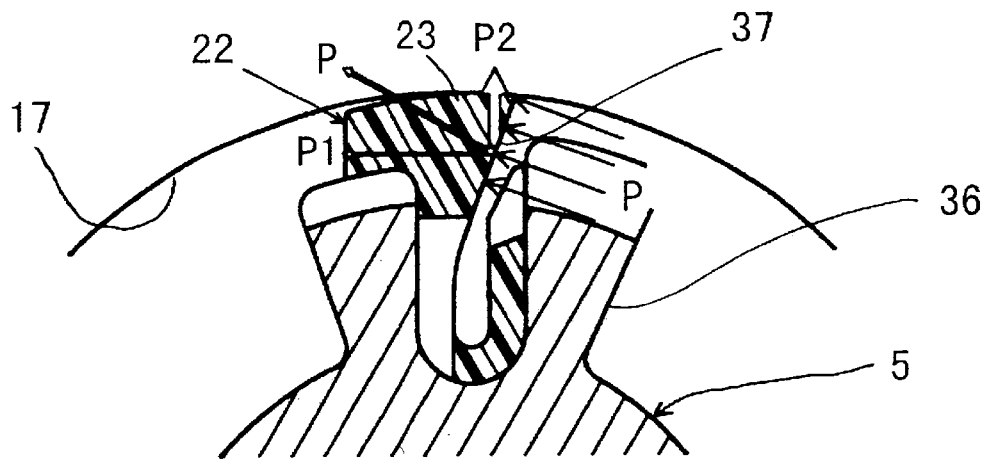
FIG. 17 is an enlarged fragmentary cross-sectional view showing a valve body having an apex seal function for use in a rotary damper according to a fifth embodiment of the present invention.
Figure 18:
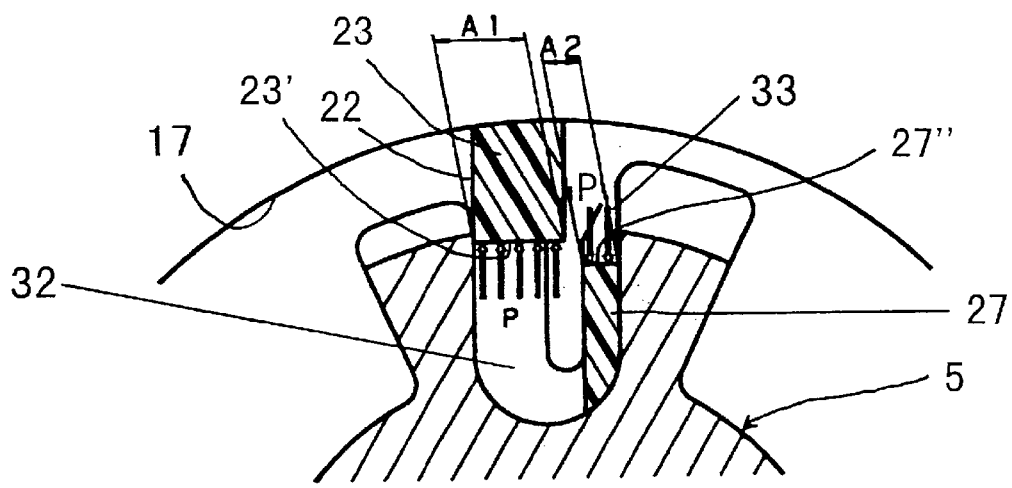
FIG. 18 is an enlarged fragmentary cross-sectional view showing a first modified valve body having an apex seal function for use in the rotary damper according to the fifth embodiment of the present invention.
Figure 19:
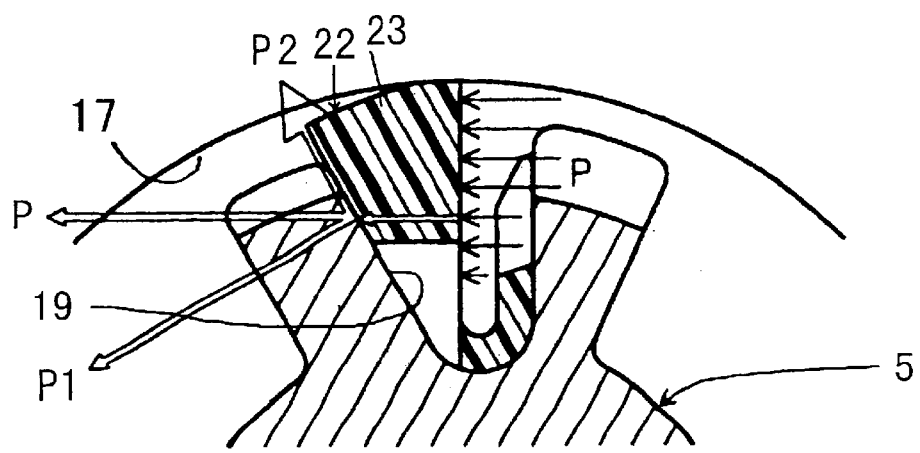
FIG. 19 is an enlarged fragmentary cross-sectional view showing a second modified valve body having an apex seal function for use in the rotary damper according to the fifth embodiment of the present invention.
Figure 20:
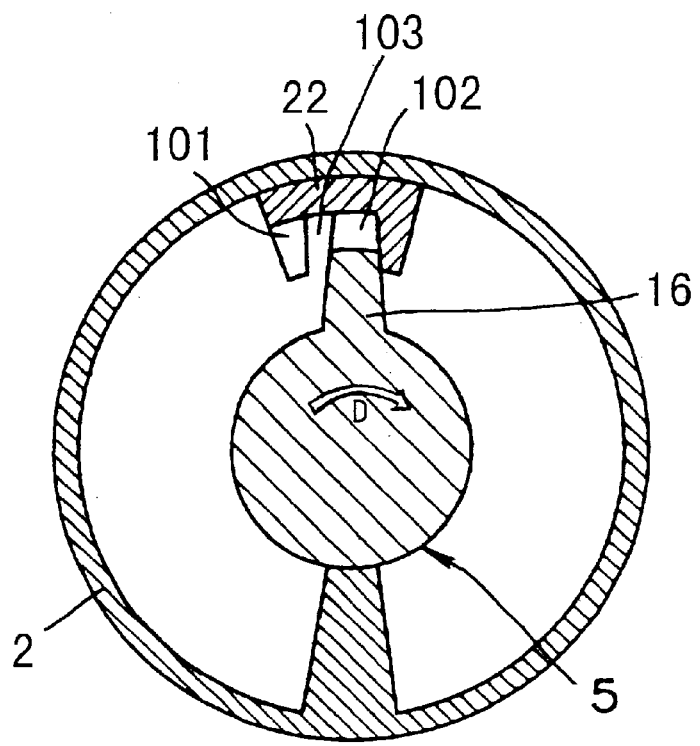
FIG. 20 is a cross-sectional view of a conventional rotary damper.
Figure 21:
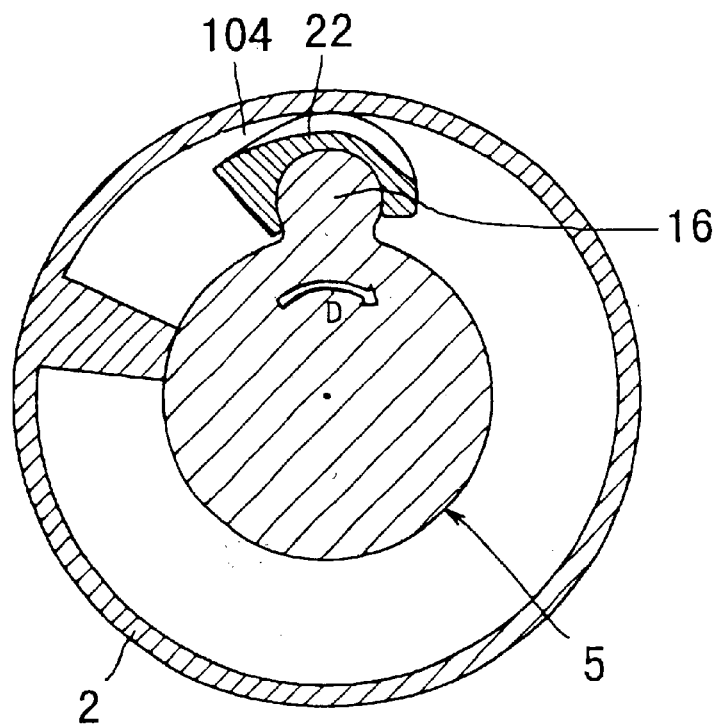
FIG. 21 is a cross-sectional view of another conventional rotary damper.
Figure 22:
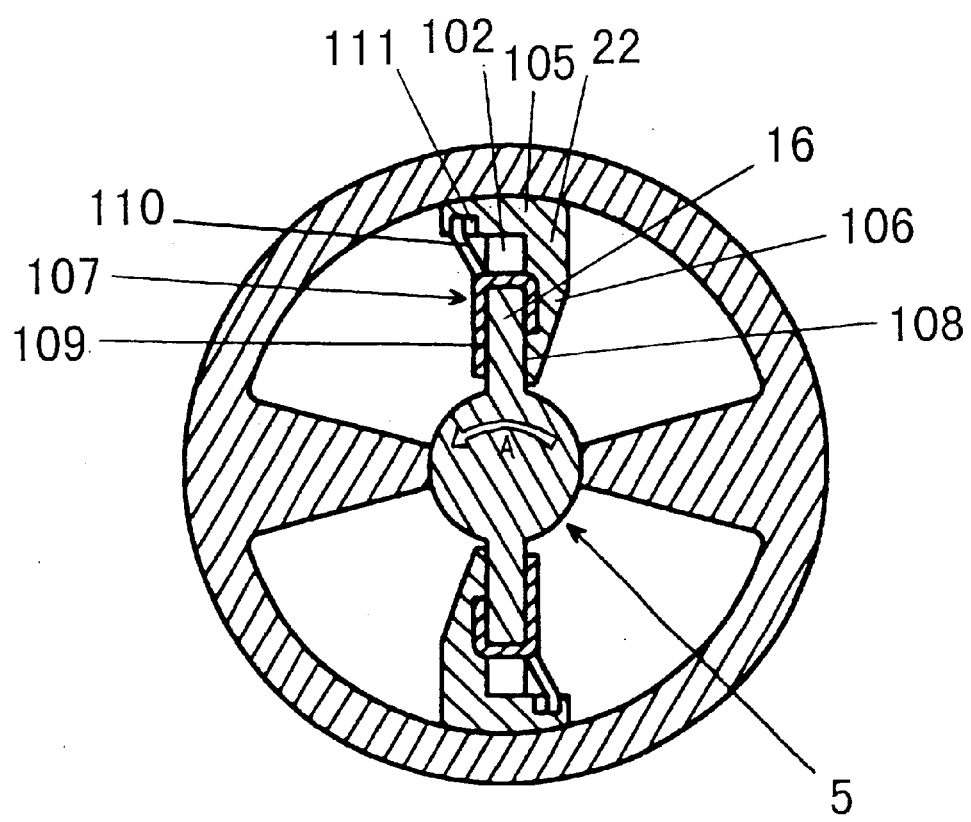
FIG. 22 is a cross-sectional view of still another conventional rotary damper.

FIGS. 1 through 7A, 7B show a rotary damper according to a first embodiment of the present invention. FIGS. 8 through 13 show a rotary damper according to a second embodiment of the present invention. FIG. 14 shows a rotary damper according to a third embodiment of the present invention. FIGS. 15A, 15B and 16A, 16B show a rotary damper according to a fourth embodiment of the present invention. FIGS. 17 through 19 show a rotary damper according to a fifth embodiment of the present invention.

The rotary damper according to the first embodiment of the present invention will first be described below with reference to FIGS. 1 through 7A, 7B.

As shown in FIGS. 4A through 4C, a rotary damper 1 according to the first embodiment of the present invention has a casing 2 having a fluid chamber 3 filled with a highly viscous fluid 4 such as silicone oil or the like and a rotatable member 5 having a base 6 disposed in the fluid chamber 3 and a shank 7 projecting from the fluid chamber 3. The shank 7 is connected to a shaft of a rotary lid, a rotary door, or the like.

The casing 2 has a closed end 8 serving as a side wall of the fluid chamber 3. The closed end 8 has a bearing recess 9 defined centrally in a surface thereof facing the fluid chamber 3. The casing 2 has an open end 10 axially opposite to the closed end 8. An end cap 13 is fixedly fitted in the open end 10 with a pressure partition 11 and an O-ring 12 interposed between the end cap 13 and the fluid chamber 3. The pressure partition 11 serves as an opposite side wall of the fluid chamber 3.

The base 6 of the rotatable member 5 includes a protrusion 6' disposed on a free end thereof remote from the shank 7 and rotatably inserted in the bearing recess 9. The shank 7 of the rotatable member 5 is rotatably supported in bearing openings 14, 15 which are defined centrally in he partition wall 11 and the end cap 13, respectively. Therefore, the rotatable member 5 is supported in the casing 2 for rotation relative to the casing 2.

As shown in FIG. 4C, the rotary damper 1 has a pair of diametrically opposite vanes 16 projecting radially outwardly from the outer circumferential surface of the base 6 toward an inner circumferential surface 17 of the fluid chamber 3. Since the vanes 16 and various components combined therewith are identical to each other, only one of the vanes 16 and components combined therewith will be described below.

Figure 1:
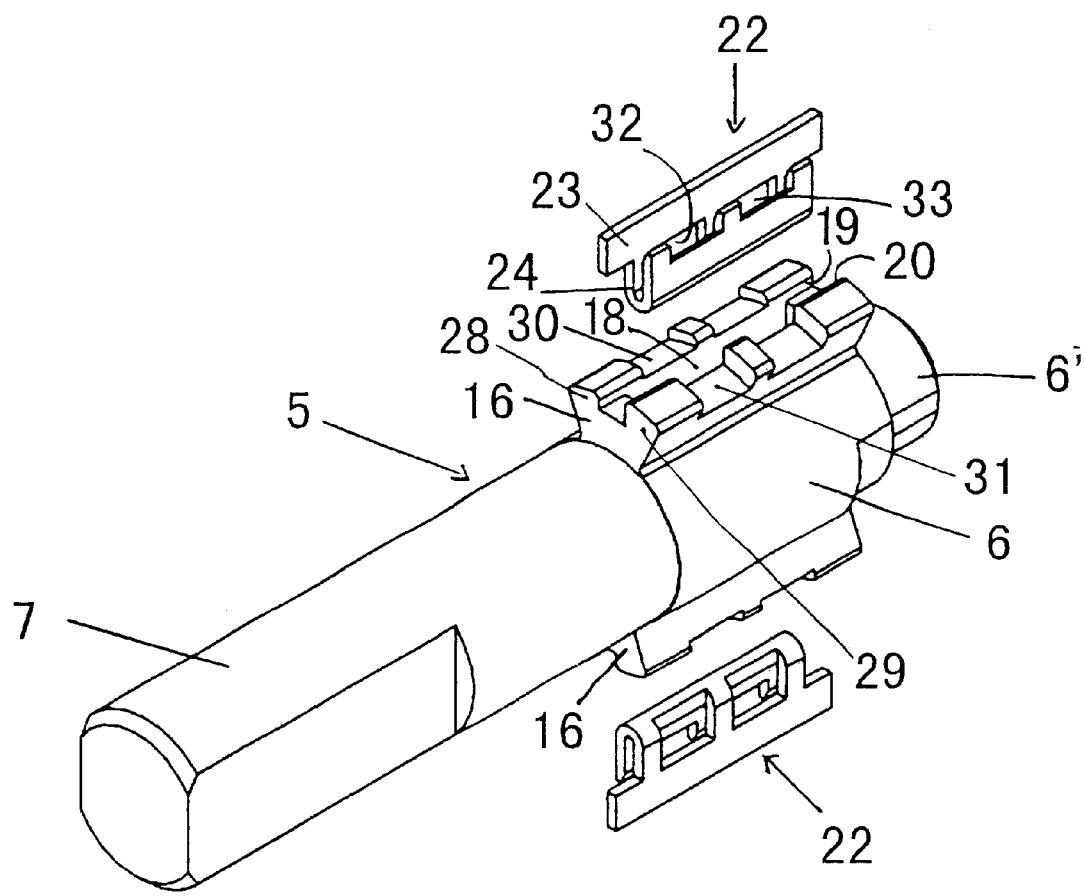
FIG. 1 is a perspective view of a rotary damper according to a first embodiment of the present invention.
Figure 3:
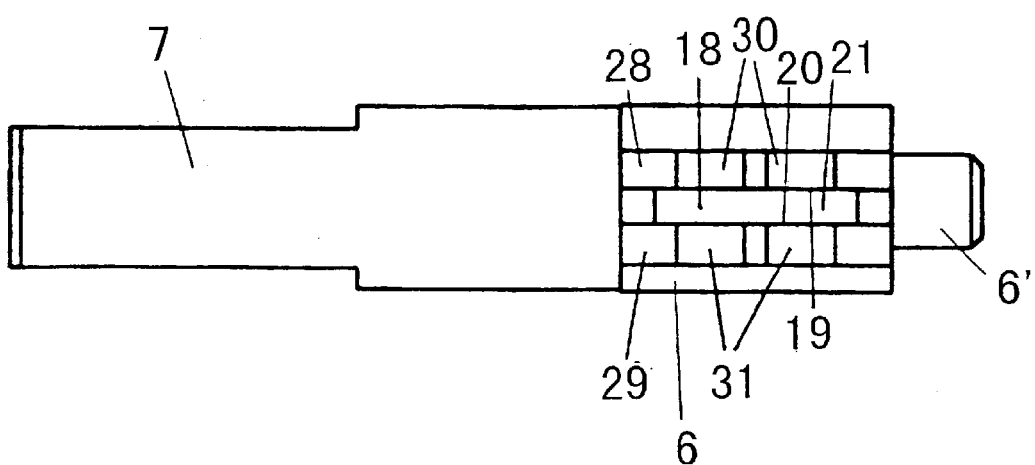
FIG. 3 is a plan view of a rotatable member with vanes of the rotary damper shown in FIG. 1.

As shown in FIGS. 1 and 3, the vane 16 has a slot 18 defined in its tip end and extending axially of the rotatable member 5. The slot 18 is defined by a first wall surface 19, a second wall surface 20 confronting and spaced from the first wall surface 19, and a bottom surface 21 joining the first and second wall surfaces 19, 20.

Figures 2A, 2B:
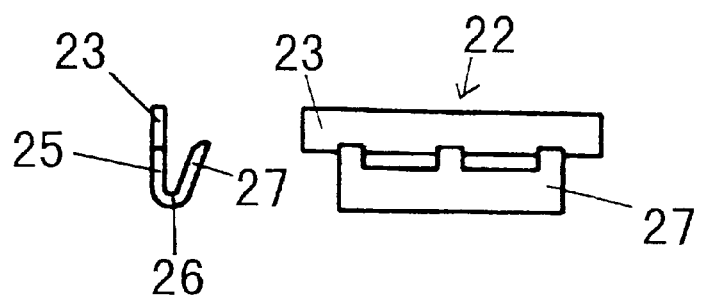
FIG. 2A is a front elevational view of a valve body of the rotary damper shown in FIG. 1.
FIG. 2B is a side elevational view of the valve body shown in FIG. 2A.

As shown in FIGS. 2A and 2B, a valve body 22 combined with each of the vanes 16 comprises a valve 23 and a spring 24 which are integrally formed of a single springy material. The valve body 22 is removably fitted in the slot 18. In the present embodiment, the valve body 22 can easily be formed by integral molding of plastics. The valve body 22 made of plastics has the advantage of highly nonmagnetic and corrosion-resistant properties. The valve body 22 serves to open and close a fluid passage which allows the viscous fluid 4 to move between a first side 35 and a second side 36 of the vane 16 to be described later on.

As shown in FIGS. 2A and 2B, the spring 24 comprises a first extension 25 extending downwardly from the valve 23, a curved portion 26 bent from the end of the first extension 25, and a second extension 27 extending upwardly from the end of the curved portion 26. The second extension 27 extends progressively away from the first extension 25 in the direction away from the curved portion 26. However, since the curved portion 26 is resilient, the valve 23 or the first extension 25 which serves as a tongue and the second extension 27 which serves as another tongue can be compressed toward each other and easily inserted into the slot 18.

With the valve body 22 fitted in the slot 18, the curved portion 26 remains curved under a load in the vicinity of the bottom surface 21 of the slot 18. Therefore, the valve 23 or the first extension 25 presses the first wall surface 19 of the slot 18, and the second extension 27 presses the second wall surface 20 of the slot 18. The spring 24 applies a urging force to the valve 23 in a direction to close a first fluid passage, described later on.

Figure 5:
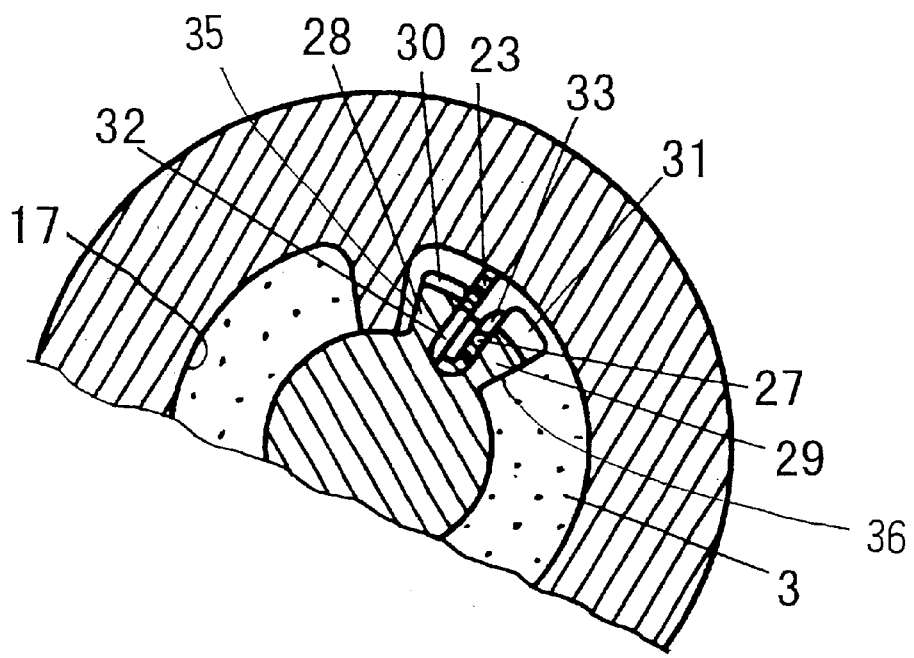
FIG. 5 is an enlarged fragmentary cross-sectional view of the rotary damper shown in FIG. 1.

As shown in FIG. 5, the valve 23 of the valve body 22 fitted in the slot 18 has its radially outer tip end held in contact with the inner circumferential surface 17 of the fluid chamber 3. When the rotatable member 5 rotates in a first direction or an idling direction, i.e., counterclockwise in FIG. 5, the valve 23 is displaced away from the first wall surface 19 under the pressure of the viscous fluid 4 from a side 35 of the vane 16. At this time, the first fluid passage, a gap between the valve body 22 and the first wall surface 19 of the vane 16, and a second fluid passage to be described later on jointly make up a fluid passage for allowing the viscous fluid 4 to move therethrough between the first side 35 and the second side 36 of the valve 16. When the rotatable member 5 rotates in a second direction or a damping direction, i.e., clockwise in FIG. 5, the first fluid passage is closed by the urging force of the spring 24 and the pressure of the viscous fluid 4 from the second side 36, thus closing the fluid passage which would otherwise allow the viscous fluid 4 to move therethrough between the first side 35 and the second side 36.

The vane 16 has opposite first and second side walls 28, 29 spaced from each other across the slot 18 and having respective recesses 30, 31 defined in their tip ends. The valve body 22 has recesses 32, 33 defined in the first extension 25 and free ends of the second extension 27. The first fluid passage for passing the viscous fluid 4 therethrough is defined by the recesses 30 in the tip end of the first side wall 28 which has the side 19 or the gap between the tip end of the first side wall 28 and the inner circumferential surface 17, and the recesses 32 in the first extension 25. The second fluid passage for passing the viscous fluid 4 therethrough is defined by the recesses 31 in the tip end of the second side wall 29 which has the side 20 or the gap between the tip end of the second side wall 29 and the inner circumferential surface 17, and the recesses 33 in the free end of the second extension 27.

Figure 6:
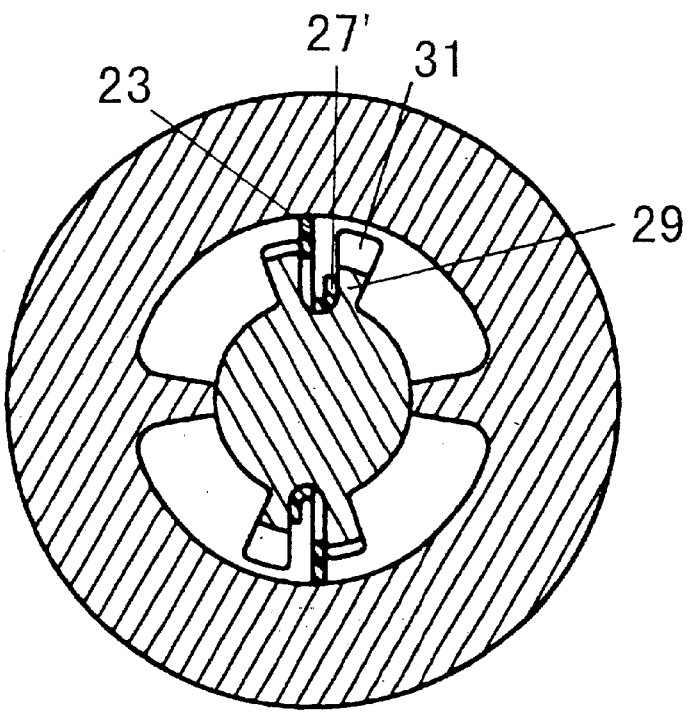
FIG. 6 is a cross-sectional view of a rotary damper incorporating a modification of the valve body of the rotary damper shown in FIG. 1.
Figure 9B:
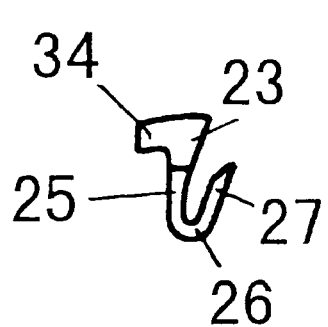
FIG. 9B is a side elevational view of the valve body shown in FIG. 9A.
Figure 9A:
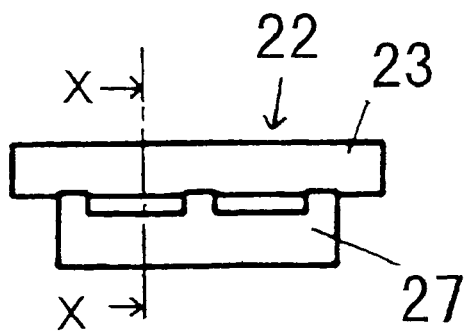
FIG. 9A is a front elevational view of a valve body of the rotary damper shown in FIG. 8.

FIGS. 6 and 7A, 7B show a modification of the valve body 22 of the rotary damper shown in FIG. 1. As shown in FIGS. 6 and 7A, 7B, the modified valve body 22 is similar to the valve body 22 according to the first embodiment (see FIGS. 2A, 2B, and 5) except that it has a second extension 27' shorter than the second extension 27 of the valve body 22 according to the first embodiment. When the modified valve body 22 is inserted in the slot 18, the curved portion 26 remains curved under a load in the vicinity of the bottom surface 21 of the slot 18. Therefore, the valve 23 or the first extension 25 presses the first wall surface 19 of the slot 18, and the second extension 27' presses the second wall surface 20 of the slot 18. The spring 24 applies a urging force to the valve 23 in the direction to close the first fluid passage. When the rotatable member 5 rotates counterclockwise in FIG. 6, the valve 23 is deformed until it engages the tip end of the second side wall 29. The second fluid passage is defined by the recesses 31. The modified valve body 22 is not required to have recesses corresponding to the recesses 33 in the free end of the second extension 27'.

The rotary damper according to the second embodiment of the present invention will be described below with reference to FIGS. 8 through 13.

As shown in FIGS. 8 through 11, the rotary damper according to the second embodiment of the present invention is similar to the rotary damper according to the first embodiment except that the valve body 23 has a ledge 34 projecting laterally therefrom. The ledge 34 fills the space between the tip end of the first side wall 28 and the inner circumferential surface 17 of the fluid chamber 3. The spring 24 of the valve body 22 according to the second embodiment is identical in structure to the spring 24 of the valve body 22 according to the first embodiment and the spring of the modified valve body 22. Those parts of the spring 24 of the valve body 22 according to the second embodiment which are identical to those of the spring 24 according to the first embodiment and the spring of the modified valve body 22 are denoted by identical reference numerals, and will not be described in detail below.

Figure 12:
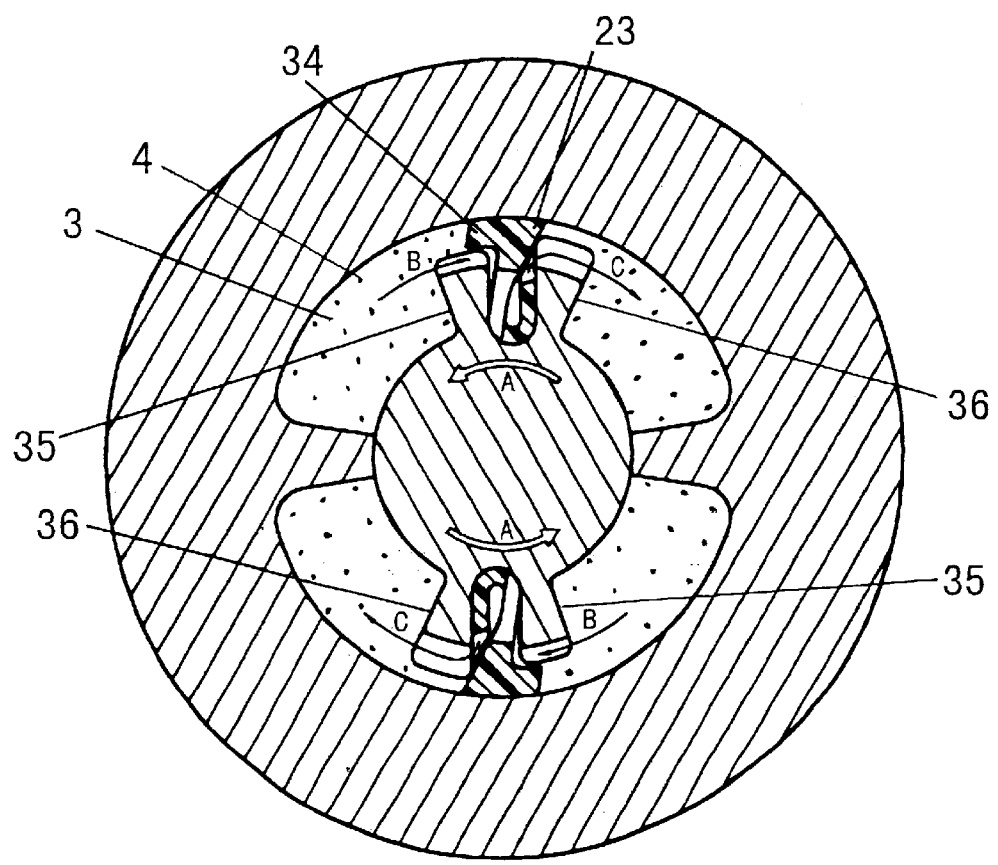
FIG. 12 is a cross-sectional view showing the manner in which the valve body shown in FIG. 9A operates when a rotatable member of the rotary damper according to the second embodiment is rotated counterclockwise.

As shown in FIG. 12, when the rotary member 5 rotates counterclockwise as indicated by the arrow A, the valve 23 with the ledge 34 is elastically deformed clockwise in the direction opposite to the direction indicated by the arrow A until the portion of the valve 23 remote from the ledge 34 engages the tip end of the second extension 27 under the resistance of the viscous fluid 4 which is filled in the fluid chamber 3 on the first side 35, against the urge of the spring 24 toward the first wall surface 19. Specifically, when the rotary member 5 rotates in the direction indicated by the arrow A, the ledge 34 directly bears the resistance of the viscous fluid 4 which is filled in the fluid chamber 3 on the first side 35, and the valve 23 except the ledge 34 bears the resistance of the viscous fluid 4 which flows in the direction indicated by the arrow B through the recesses 30 in the tip end of the first side wall 28. Therefore, the valve 23 is quickly elastically deformed clockwise in the direction opposite to the direction indicated by the arrow A.

As the valve 23 is thus elastically deformed, the first extension 25 of the spring 24 which has the recesses 32 is immediately brought out of contact with the first wall surface 19, thus quickly opening the first fluid passage defined by the recesses 30, 32. The viscous fluid 4 flows from the fluid chamber 3 on the first side 35 through the first fluid passage, and then flows in the direction indicated by the arrow C through the second fluid passage defined by the recesses 33 in the second extension 27 and the recesses 31 in the second side wall 29 into the fluid chamber 3 on the second side 36. While the rotatable member 5 is rotating counterclockwise, i.e., in the idling direction, the viscous fluid 4 filled in the fluid chamber 3 moves smoothly from the first side 35 to the second side 36 through the valve body 22 which is thus open. Therefore, the rotary damper does not make a damping action while the rotatable member 5 is rotating in the idling direction.

Figure 13:
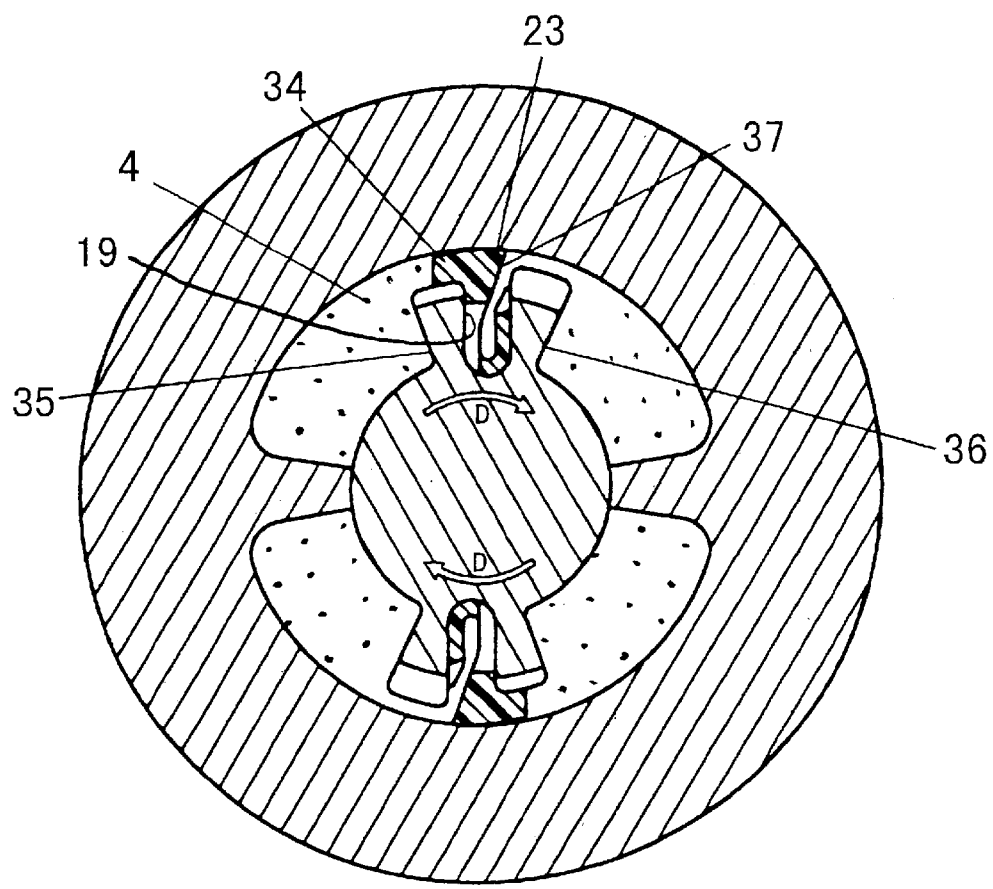
FIG. 13 is a cross-sectional view showing the manner in which the valve body shown in FIG. 9A operates when the rotatable member of the rotary damper according to the second embodiment is rotated clockwise.
Figure 14:
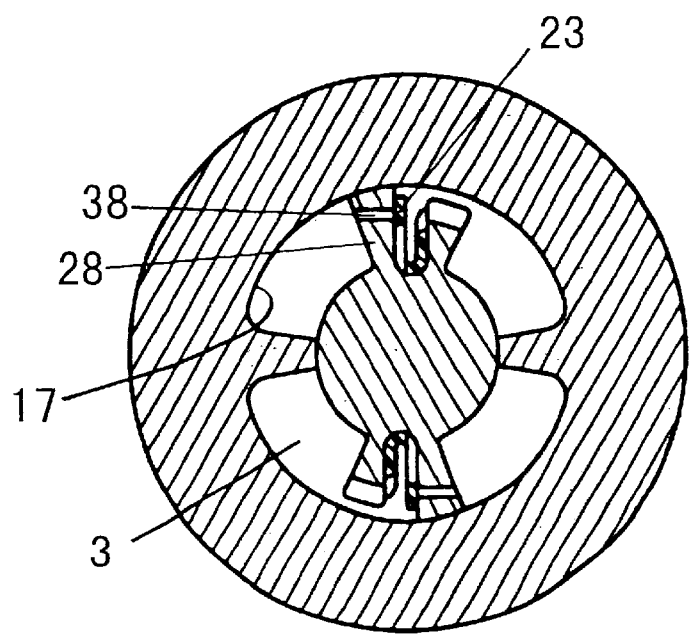
FIG. 14 is a cross-sectional view of a rotary damper according to a third embodiment of the present invention with a valve body inserted in a slot in a vane.

When the counterclockwise rotation of the rotatable member 5 is stopped, the elastically deformed valve 23 immediately springs back toward and into close contact with the first wall surface 19 under the urge of the spring 19 toward the first wall surface 19, as shown in FIG. 13. The valve body 22 is now closed, instantaneously closing the first fluid passage which has been open. The instant the rotation of the rotatable member 5 in the idling direction is stopped, the rotary damper is ready for making a damping action and hence is free of backlash. As shown in FIG. 13, when the rotatable member 5 rotates clockwise in the direction indicated by the arrow D, i.e., in a direction to make a damping action, the valve body 22 has already been closed at the time of starting to generate a torque, and rotates while a pressure-bearing surface 37 of the valve 23 remote from the first wall surface 19 is being subject to the large resistance of the viscous fluid 4 on the second side 36. Consequently, the rotary damper immediately produces a high torque in the fluid chamber 3, and quickly causes a damping effect.

A rotary damper according to a third embodiment of the present invention will be described below with reference to FIG. 14.

In the third embodiment, the first side wall 28 of the vane 16 has its tip end held in contact with the inner circumferential surface 17 of the fluid chamber 3 and has a hole 38 defined therein near the tip end. The hole 38 serves part of the first fluid passage. As shown in FIG. 14, it is sufficient for the valve 23 of the valve body 22 to be disposed in a position to be able to close the hole 38. The valve 23 of the valve body 22 may be identical to the valve 23 of the valve body 22 shown in FIG. 5 or 6. The second extension of the valve body 22 may also be identical to the second extension 27 of the valve body 22 shown in FIG. 5 or the second extension 27' of the valve body 22 shown in FIG. 6, and the tip end of the valve 23 may be terminate short of the inner circumferential surface 17 of the fluid chamber 3. Therefore, the valve body 22 of the rotary damper according to the third embodiment may be constructed with a relatively low dimensional accuracy.

A rotary damper according to a fourth embodiment of the present invention will be described below with reference to FIGS. 15A, 15B and 16A, 16B.

Figure 10:
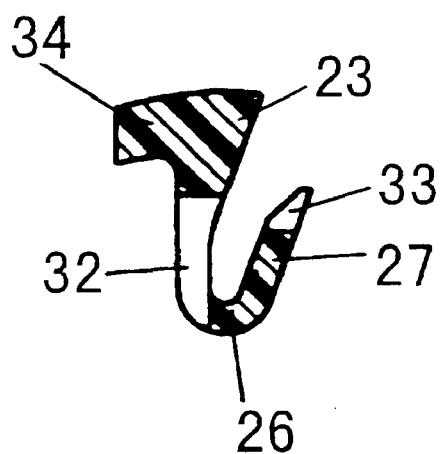
FIG. 10 is a cross-sectional view taken along line X—X of FIG. 9A.
Figure 11:
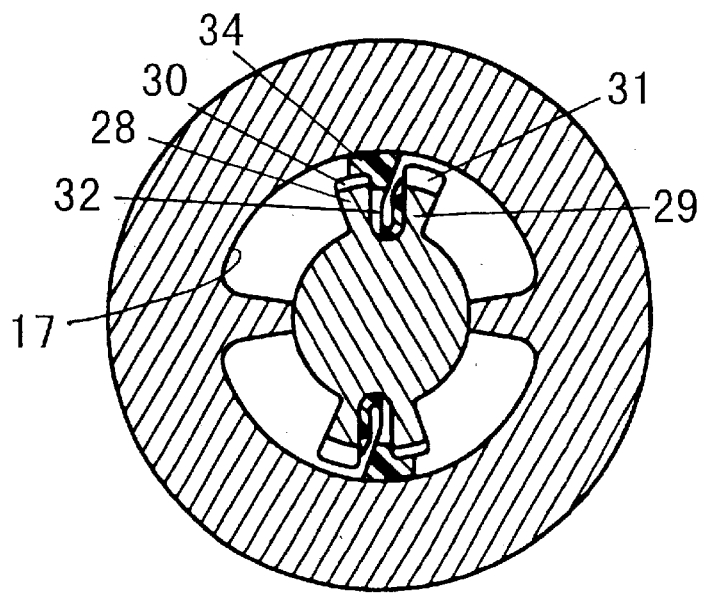
FIG. 11 is a cross-sectional view of the rotary damper in which the valve body shown in FIG. 9A is inserted in a slot in a vane.

As shown in FIG. 15A, the valve body 22 of the rotary damper according to the fourth embodiment differs from the valve body 22 shown in FIG. 10 in that a stopper 39 projecting toward the valve 23 is disposed on the spring 24 in the vicinity of the free end thereof, i.e., on the second extension 27 in the vicinity of the tip end thereof. As shown in FIG. 15B, the stopper 39 is effective to greatly limit the range of movement of the valve 23, and hence the elastic deformation of the first extension 25 of the spring 24 in the direction opposite to the urging direction of the spring 24. Accordingly, the spring 24 is essentially free of elastic fatigue even when the rotary damper is used over a long period of time.

FIG. 16A shows in cross section another valve body 22 for use in the rotary damper according to the fourth embodiment of the present invention. The valve body 22 shown in FIG. 16A differs from the valve body 22 shown in FIG. 10 in that it has a third extension 40 integral with the free end of the spring 24, i.e., the tip end of the second extension 27, and bent away from the valve 23. When the rotary damper is assembled by fitting the valve body 22 in the slot 18, as shown in FIG. 16B, the third extension 40 is loosely fitted in a hole 41 defined in the second side wall 29 with radial play provided around the third extension 40. The third extension 40 fitted in the hole 41 prevents the valve body 22 from being accidentally removed from the slot 18 when the rotary damper is assembled.

In the above embodiments, if the valve body 22 is in the form of a leaf spring, then the valve 23 has a large area for bearing the resistance of the fluid in the fluid chamber 3. Consequently, the valve body 22 is in the form of a leaf spring is advantageous in that it can easily open the fluid passage when the rotary damper is rotated in a direction to open a lid to which the rotary damper is coupled.

An apex seal function which the valve body of a rotary damper according to a fifth embodiment of the present invention has will be described below with reference to FIGS. 17 through 19.

FIG. 17 shows a valve body 22 including a valve 23 which has a pressure-bearing surface 37 inclined inwardly to a first extension 25. When a rotatable member 5 rotates clockwise, the inclined pressure-bearing surface 37 bears an internal pressure P of the viscous fluid 4 filled in the fluid chamber 3 on the second side 36, which internal pressure P is applied perpendicularly to the inclined pressure-bearing surface 37 as indicated by the arrows. The internal pressure P is divided into a component P1 and a component P2 which act in respective directions perpendicular to each other. The component P2 acts to lift he valve body 22 toward the inner circumferential surface 17 of the fluid chamber 3, pressing the tip end of the valve 23 against the inner circumferential surface 17. Therefore, the valve 23 and the inner circumferential surface 17 are completely sealed against each other, resulting in an apex seal function.

FIG. 18 shows a first modified valve body 22 having an apex seal function. The first modified valve body 22 includes a valve 23 having a lower flat surface 23' defined by the recesses 32 in the first extension 25. The lower flat surface 23' comprises a flat surface which is made large by having a large width A1, though the large flat surface may be produced by other than having the large width A1. The valve body 22 includes a second extension 27 having an upper flat surface 27" defined by the recesses 33 in the second extension 27. The upper flat surface 27" comprises a flat surface which is made small by having a small width A2, though the small flat surface may be produced by other than having the small width A2. When the rotatable member 5 rotates clockwise, since the internal pressure of the viscous fluid to the right side of the valve body 22 is applied equally to all the areas of the valve body 22, the valve body 22 is lifted toward the inner circumferential surface 17 of the fluid chamber 3 due to the difference between the pressing force applied to the large flat surface 23' in the direction toward the inner circumferential surface 17 and the pressing force applied to the small flat surface 27" in the direction away from the inner circumferential surface 17, completely sealing the valve 23 and the inner circumferential surface 17 against each other. Specifically, the valve 23 and the inner circumferential surface 17 are sealed against each other due to the difference between the area of the large flat surface 23' and the area of the small flat surface 27", i.e., the difference between (the width A1 of the large flat surface 23'×the length of the large flat surface 23'×the internal pressure P) and (the width A2 of the small flat surface 27"×the length of the small flat surface 27"×the internal pressure P).

FIG. 19 shows a second modified valve body 22 having an apex seal function. The vane 16 has a first wall surface 19 inclined to the left, and the second modified valve body 22 includes a first extension 25 having a left surface inclined in contact with the first wall surface 19 and a right surface extending substantially vertically. Since the internal pressure P of the viscous fluid to the right side of the valve body 22 is applied equally to all the areas of the valve body 22, the internal pressure P of the viscous fluid is also applied equally to the substantially vertical right surface of the first extension, as shown in FIG. 19. The internal pressure P is divided into a component P1 applied perpendicularly to the first wall surface 19 and a component P2 applied parallel to the first wall surface 19. The component P2 acts to lift the valve body 22 toward the inner circumferential surface 17 of the fluid chamber 3, pressing the tip end of the valve 23 against the inner circumferential surface 17. Therefore, the valve 23 and the inner circumferential surface 17 are completely sealed against each other, resulting in an apex seal function.

In the above description of the apex seal functions, forces having relatively large effects have been pointed out as forces for pressing the valve body 22 toward the inner circumferential surface 17. Actually, however, various forces are applied from the viscous fluid to all the surfaces of the valve body 22, and the differential pressure resulting from those applied forces acts to press the valve body 22 toward the inner circumferential surface 17.

The rotary dampers free of backlash according to the present invention include the valve body for opening and closing the fluid passage, the valve body comprising the valve and the spring that are integrally formed with each other. The number of parts of the valve body is greatly reduced, and the valve body is simple in structure. The valve body with the spring function can easily be mounted in the gap or slot in the vane which is relatively small in size as the rotary damper is small in size. Consequently, the rotary damper can be manufactured at a reduced cost.

Although certain preferred embodiments of the present invention have been shown and described in detail, it should be understood that various changes and modifications may be made therein without departing from the scope of the appended claims.

What is claimed is:

1. A rotary damper comprising:
   a casing having a fluid chamber filled with a fluid;
   a rotatable member disposed in said fluid chamber for rotation relative to said casing;
   a vane disposed on an outer circumferential surface of said rotatable member and extending in an axial direction thereof, said vane projecting toward an inner circumferential surface of said fluid chamber and having a first side and a second side opposite to said first side;
   a fluid passage for allowing the fluid to flow between said first side and said second side proximate a tip end of said vane; and
   a valve body mounted on said vane for selectively opening and closing said fluid passage;
   said vane defining an axially extending slot in the tip end thereof, said valve body being removably fitted in said slot;
   said valve body comprising a valve disposed in a position for closing said fluid passage and a spring continuously urging said valve in a direction to close said fluid passage, said valve and said spring being integrally formed as one piece;
   wherein when said rotatable member rotates in a first direction, said valve opens said fluid passage against the urge of said spring under a pressure of the fluid on said first side of the vane, when said rotatable member stops against rotation, said valve instantaneously closes said fluid passage under the urge of said spring, and when said rotatable member rotates in a second direction, said valve keeps said fluid passage closed under the urge of said spring and a pressure of the fluid on said second side of the vane.

2. A rotary damper according to claim 1, wherein said valve body comprises a springy material.

3. A rotary damper according to claim 2, wherein said springy material comprises a nonmetal spring material.

4. A rotary damper according to claim 2, wherein said springy material comprises a metal spring material.

5. A rotary damper according to claim 2, wherein said valve body comprises a leaf spring.

6. A rotary damper according to claim 1, wherein said slot is defined by a first wall surface, a second wall surface confronting said first wall surface, and a bottom surface joining said first wall surface and said second wall surface to each other, said valve fitted in said slot extending across said fluid passage to block said fluid passage and having at least a portion held against said first wall surface, said spring comprising a first extension extending from said valve, a curved portion extending from said first extension, and a second extension extending from said curved portion, such that said spring applies an urging force to said valve in a direction to close said fluid passage when a load is applied to said curved portion.

7. A rotary damper according to claim 6, wherein said fluid passage is defined between the tip end of said vane and the inner circumferential surface of said fluid chamber, said valve extending radially outwardly and having a tip end thereof held against the inner circumferential surface of said fluid chamber.

8. A rotary damper according to claim 7, wherein said valve comprises a ledge filling the space, serving as said fluid passage, between the tip end of said vane and the inner circumferential surface of said fluid chamber.

9. A rotary damper according to claim 6, wherein said tip end of the vane is held in contact with the inner circumferential surface of said fluid chamber, and said fluid passage is defined in the tip end of said vane.

10. A rotary damper according to claim 6, wherein said second extension has an end for limiting a range of movement of said valve when said valve is displaced away from said first wall surface and opens said fluid passage.

11. A rotary damper according to claim 1, wherein said valve has an apex seal function.

* * * * *